(No Model.)

H. D. PAGE & W. E. RAYNOR.
TWO WHEELED VEHICLE.

No. 274,217. Patented Mar. 20, 1883.

Witnesses,
Geo. H. Strong.
J. H. Krouse

Inventors,
H. D. Page
Wm. E. Raynor
By Dewey & Co.
Attorneys

UNITED STATES PATENT OFFICE.

HENRY D. PAGE AND WILLIAM E. RAYNOR, OF SAN BERNARDINO, CAL.

TWO-WHEELED VEHICLE.

SPECIFICATION forming part of Letters Patent No. 274,217, dated March 20, 1883.

Application filed December 5, 1882. (No model.)

*To all whom it may concern:*

Be it known that we, HENRY D. PAGE and WILLIAM E. RAYNOR, of San Bernardino, county of San Bernardino, State of California, have invented an Improved Two-Wheeled Vehicle; and we do hereby declare the following to be a full, clear, and exact description thereof.

Our invention consists in certain details of the construction of divided shafts and connecting devices to be applied to two-wheeled vehicles, as will hereinafter fully appear, reference being made to the accompanying drawings.

Figure 1:
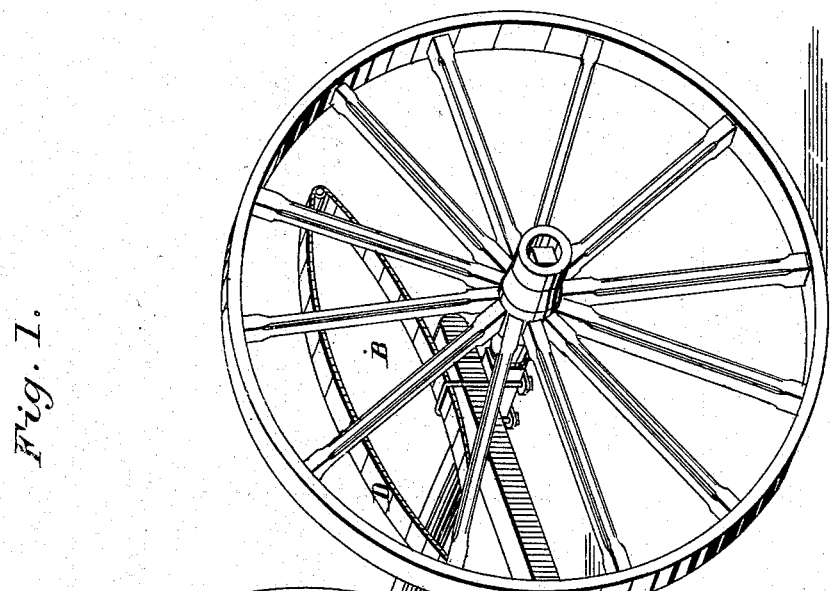
Figure 2:
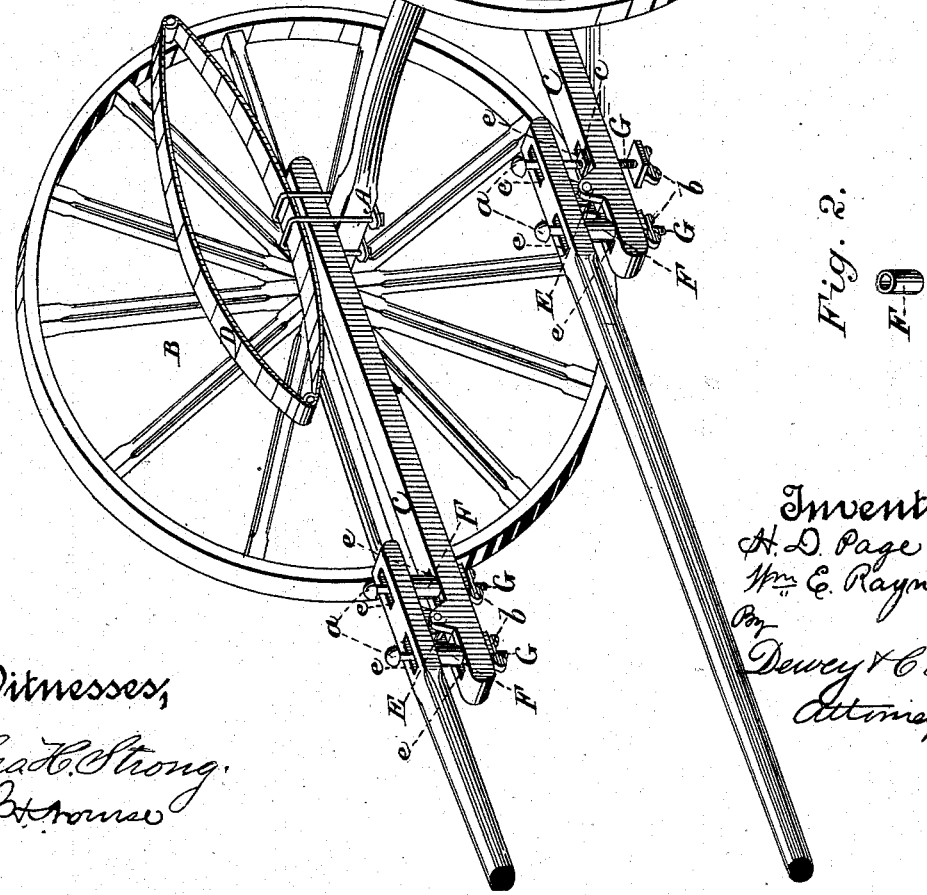

Figure 1 is a perspective view. Fig. 2 is a detail showing buffer F.

Let A represent the axle; B, the wheels; C, the shafts clipped to the axle, and D the ordinary elliptical side springs, upon which the body may be secured in any suitable manner. The shafts or thills, instead or being one single rigid piece throughout their length, are severed at a point forward of the wheels, and near, or even slightly beyond, where the front part or edge of the foot-rest would naturally come. The severed ends of the shaft overlap some little distance, and are connected by a hinge or knuckle joint, E, formed in any suitable manner, and here shown as being made by pivoting together lugs or projections upon each portion of the shaft. In the severed ends of the shafts, on each side of the hinge or joint E, are made elongated slots $e$, in correspondingly opposite positions. The two portions of the shaft are held apart by intervening elastic buffers, springs, or cushions, F F, through which and through the slots $e$ pass bolts G G. The upper ends of these bolts are loosely fitted in the upper slots and have heads $a$. Their lower ends project through the lower portion of the shaft and receive thumb-nuts $b$. In the lower ends of the buffers are nuts $c$ upon the bolts. These lie upon the top of lower slots and form shoulders or jam-nuts, whereby when the thumb-nuts are screwed up the bolts may be firmly secured in the lower slots, though being loose in the upper slots, to provide for the swinging of the forward portion of the shafts upon their hinge. When the thumb-nuts $b$ are loosened the bolts, with their buffers, may be moved to or from the joint or hinge, as may be required in loading the cart and balancing it. The effect of this divided and hinged shaft is to prevent the motion of the forward part from being transmitted to the after part, and thence through the axle to the body.

Having thus described our invention, what we claim as new, and desire to secure by Letters Patent, is—

1. In a two-wheeled vehicle, the severed shafts C, the ends of which overlap, and are provided with elongated slots $e$, in combination with the joint or hinge E, the intervening springs or buffers, F F, and the bolts G G, loose in the upper slots and secured firmly in the lower, substantially as herein described.

2. In a two-wheeled vehicle, the severed shafts C, having elongated slots $e$, in combination with the joint or hinge E, the intervening springs or buffers, F F, and the adjustable bolts G G, loose in the upper slots, and secured in the lower by means of the thumb-nuts and jam-nuts, substantially as herein described.

In witness whereof we hereunto set our hands.

HENRY D. PAGE.
WILLIAM E. RAYNOR.

Witnesses:
HENRY GOODCELL, Jr.,
H. L. BRANTHAUR.